March 1, 1960     L. H. MORIN     2,926,866
MOLDED PLASTIC SPOOL

Filed June 22, 1953     2 Sheets-Sheet 1

INVENTOR.
LOUIS H. MORIN
BY
ATTORNEY

March 1, 1960 L. H. MORIN 2,926,866
MOLDED PLASTIC SPOOL
Filed June 22, 1953 2 Sheets-Sheet 2
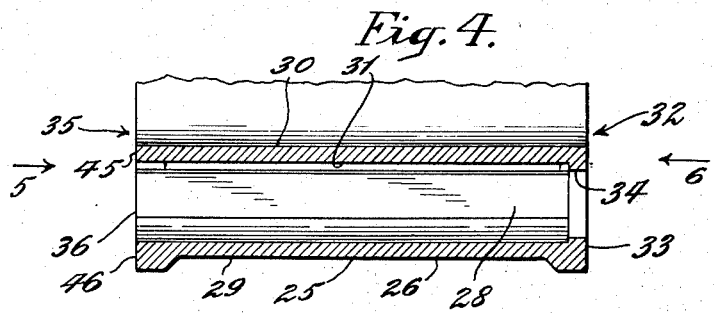
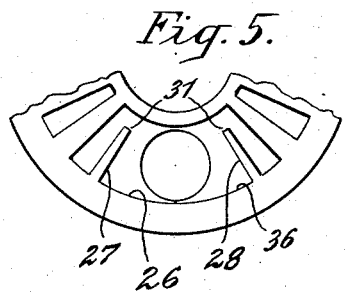
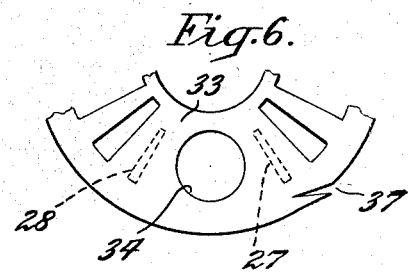
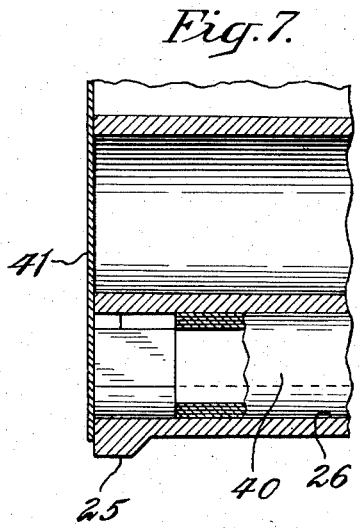
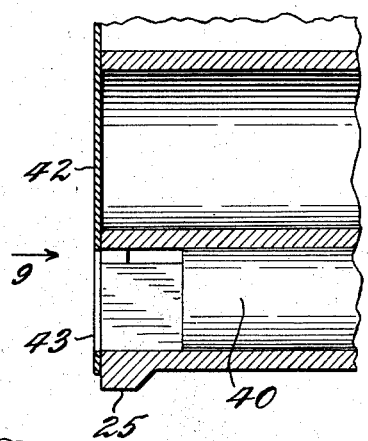
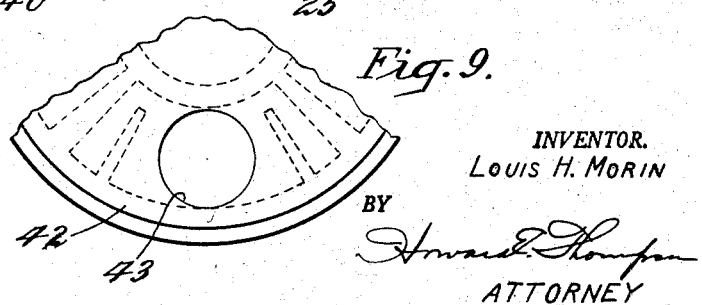
INVENTOR.
Louis H. Morin
BY
Howard Thompson
ATTORNEY

United States Patent Office 2,926,866
Patented Mar. 1, 1960

2,926,866

MOLDED PLASTIC SPOOL

Louis H. Morin, Bronx, N.Y., assignor to Coats & Clark, Inc., New York, N.Y., a corporation of Delaware Application June 22, 1953, Serial No. 363,281

3 Claims. (Cl. 242—118.4)

This invention relates to thread spools formed as a unitary molded plastic body. More particularly, the invention deals with a spool comprising inner and outer tubular bodies joined together at each end by a group of end wall portions which provide surfaces to which end ticket labels may be attached. A feature of the spool is its reduction in weight by comparison with conventional spools. Still more particularly, the invention deals with a spool structure wherein the spool has a pocket or chamber formed therein.

The novel features of the invention will be best understood from the following description when taken together with the accompanying drawing, in which certain embodiments of the invention are disclosed, and in which the separate parts are designated by suitable reference characters in each of the views, and in which:

Fig. 4 is a view like Fig. 3 but showing another modification;

Fig. 5 is a partial view looking in the direction of the arrow 5 of Fig. 4;

Fig. 6 is a partial view looking in the direction of the arrow 6 of Fig. 4;

Fig. 7 is a partial, enlarged, sectional view of the spool of Fig. 4 showing additional details;

Fig. 8 is a view like Fig. 7 showing a modification; and

Fig. 9 is a partial view looking in the direction of the arrow 9 of Fig. 8.

Figure 1:
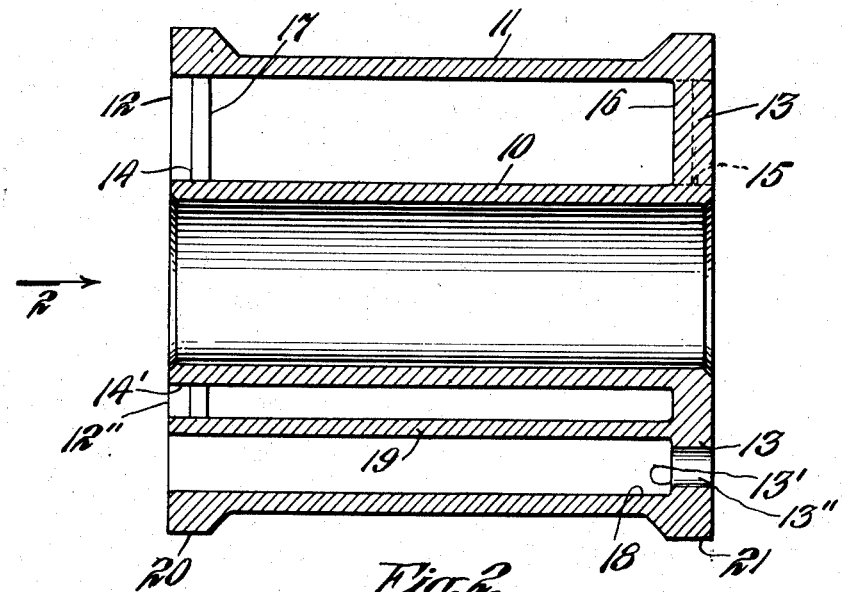
Fig. 1 is a longitudinal sectional view through a spool made according to my invention, the section being on the line 1—1 of Fig. 2.
Figure 2:
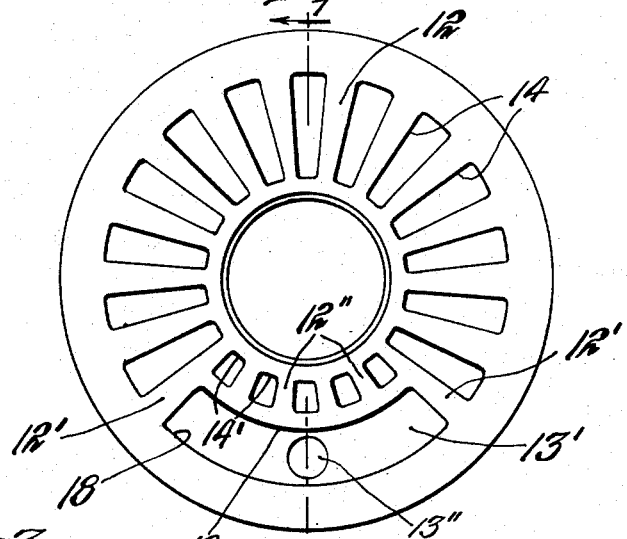
Fig. 2 is an end view of the structure as seen in Fig. 1, looking in the direction of the arrow 2 of Fig. 1.

In the drawing, I have shown a plastic molded spool comprising an inner tube or sleeve 10, an outer tubular body portion or barrel 11 spaced from and integrally united with the tube 10 in a multiplicity of end wall-forming members or portions 12 and 13. Between these members are spaces or openings as, for example, the openings 14 shown in Fig. 2 and indicated at 15 at the right of Fig. 1. The openings 14 are in alignment with the members 13, and the openings 15 are in alignment with the members 12. The members 12, 13 have inwardly projecting ribs identified in Fig. 1 as 16, 17, respectively. Cores and dies for forming a spool of the foregoing type by a die casting method are described in copending application Serial No. 363,364, filed June 22, 1953, now Patent No. 2,890,490.

One section or portion of the spool body is modified, in so far as the arrangement of the wall portions 12 is concerned, to provide a circumferentially long and narrow chamber 18 extending to a large wall portion 13' at the other end of the spool. In other words, in forming the large chamber 18 a circumferentially continuous, curved wall 19 is provided between the inner tube 10 and the outer tubular body 11, this wall, which may be termed a supplemental wall, terminating at the end wall portions 12' shown in Fig. 2 of the drawing. In this particular section, the end wall portions 12 are short, as seen at 12", and join the tube 10 with the wall 19. Corresponding small openings 14' are formed in the end of the spool body. The opposite end of the spool has end wall portions and openings which correspond to, but are offset from, portions 12 and openings 14', respectively. The ends of the spool body have enlarged bevelled surface rims 20 and 21 which help to form the end faces of the spool. Both end faces provide large surface areas for attachment of the conventional labels to the ends of the spool body. As later described, the label may have an opening therein registering with the chamber. This chamber may serve to support advertising or other literature, or other articles that may be utilized in an associated way with the art of sewing. The end wall 13' has an opening 13" through which a rod can be passed to help push out articles or papers from the compartment or pocket.

Figure 3:
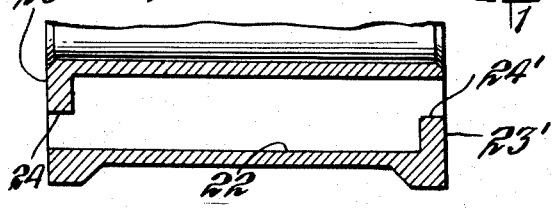
Fig. 3 is a part section similar to Fig. 1 showing a modification.

In Fig. 3 of the drawing, the spool has a chamber 22 which is larger in radial dimensions than the chamber 18, and this chamber is partially closed at one end by a wall 23 generally similar to the wall 19. An opening 24 gives access to the chamber 22. The other end of the spool has a wall 23' similar to the wall 23, and in the wall 23' is formed an opening 24' similar to the opening 24.

Opening 24' is in alignment with the wall 23. The walls 23, 23' help to retain an article against accidental displacement from the chamber 22.

In Figs. 4–6 a spool 25 is shown having a pocket 26 partly defined by a pair of spaced side walls 27, 28 which extend longitudinally of the spool from end to end. Walls 27, 28 extend from the barrel 29 to a point short of the inner tube 30, a gap 31 appearing between tube 30 and the walls 27, 28. At one end 32 of the spool the walls 27, 28 are integrally formed with a large end wall portion 33 in which is provided a reduced circular opening 34. Walls 27, 28 terminate flush with inner tube 30 and barrel 29 at the opposite end 35 of the spool. As apparent, inner tube 30 and barrel 29 form the upper and lower walls of the pocket 26. The cross-sectional shape of pocket 26, and also of opening 36, is that of the sector of an annulus. Coiled or folded literature may be removed from the pocket through opening 36 by pushing it forward with a rod or other device inserted through opening 34.

In Fig. 6 is shown a nick 37 for holding a thread end. This nick is distinguished from nicks in conventional wood spools by being non-chippable, that is, resistant to breaking. All of the spools described herein are characterized by having a non-chip nick.

In Figs. 7–9 is shown a coiled piece 40 of literature or informative matter in the pocket 26 of spool 25. An end ticket label 41 is shown in Fig. 7. To remove the piece 40, the user may push a rod through the opposite end opening, note 34 of Fig. 6, and force the piece 40 through label 41. The user can easily find such opening 34 beneath the ticket label opposite label 41 and break through the label. In Figs. 8 and 9, the label 42 has an opening 43 through which said rod can be inserted and the piece 40 removed, the label 42 preferably being mounted on the end in which opening 34 is located. All of the spool modifications described herein may have labels like 41 or 42.

To summarize the invention, and to note further details, it will be appreciated that the present spool or spools are preferably all plastic. It is made in one piece. Each end wall or face can be considered as comprising the annular end surface of the inner tube (for example, note 45 in Fig. 4), the annular end surface of the flanged tubular body or barrel (note 46 in Fig. 4), and, intermediate said annular surfaces, a group of radially arranged alternate end wall portions and spaces. The end wall portions are in the form of tapered spokes, although they may have other forms. The annular end surfaces of the inner tube and of the flanged barrel lie in the same plane as the outer surfaces of the spokes. Each end face has sufficient surface area sufficiently distributed thereover as to enable ticket labels to be adhered to it. The spokes in one end wall are offset with respect to the spokes in the other end wall so that each spoke in one wall is opposite a space in the other wall. In Figs. 3 and 4-9, each spoke in one wall is unconnected to any of the spokes in the other wall except through the inner tube and the outer barrel.

All of the spools are characterized by having a longitudinally extending pocket intermediate the inner tube and the outer barrel. The pocket has the cross-sectional form of the sector of an annulus and has an opening in each end face of the spool. At least one of the pocket openings has the outline form of the sector of an annulus; also, one of the pocket openings is reduced in size by comparison with the cross-section of the pocket.

In Fig. 3, one of the pocket openings is provided with an overhanging wall, note 23. The spools of Figs. 3 and 4-9 have a pocket of which the inner tube of the spool constitutes the upper wall.

As noted, the spool is particularly adapted for holding sewing thread for domestic use. It is light in weight, averaging about one-third, or less, of the weight of a wood spool, and economizes material. Despite its lightness, it is strong and rigid. It is capable of being produced in large quantities in a smooth, finished condition by a high speed casting operation.

Having fully described my invention, what I claim as new and desire to secure by Letters Patent is:

1. A spool structure comprising inner and outer spaced tubes joined at ends of the spool in circumferentially spaced end wall members, the ends of the spool having annular outwardly projecting rims, end surfaces of the rims being in alignment with outer surfaces of said members to form mounting surfaces for labels at the ends of the spool, means forming with the outer tube a chamber opening through one end of the spool and extending substantially to the other end thereof, said means comprising a supplemental longitudinal wall extending between said end walls, said supplemental wall being disposed between, but out of contact with, said tubes, said end wall members having inwardly projecting short reinforcing ribs joining said spaced inner and outer tubes, and short end wall members integrally joining the supplemental wall with the inner tube.

2. A molded plastic spool of the character described comprising a tubular body defined by inner and outer spaced tubes, end wall members integrally joining the inner and outer tubes at the ends of said tubes, means forming with the outer tube a chamber extending along the length of the spool and opening through an end thereof, said last named means comprising a curved wall arranged between and spaced from the inner and outer tubes, said chamber having a height which is less than the distance between said tubes as measured along a radial line extending from the axial center of the inner tube to the outer tube, and short end wall members joining said last named wall with the inner tube.

3. A plastic thread spool comprising an inner tube, an outer thread holding barrel having flanged ends, a pair of end faces, and a group of spaced end wall members in each end face connecting the tube and barrel, said members of each end face having flushly disposed outer surfaces and being adapted to receive an end ticket label thereon, a chamber in the spool for receiving and holding a piece of literature or other article relating to thread, said chamber being disposed on one side of the tube intermediate the tube and barrel and extending parallel to the central longitudinal axis of the spool, said chamber extending from end to end of the spool and having an opening through each end face thereof, said chamber being at least partly defined by said barrel, by a wall portion in an end face, and by a second wall portion which throughout the length thereof is spaced from and out of contact with said tube, one end face lacking a portion of said end wall members, thereby forming one of said chamber openings, the other chamber opening comprising an aperture in said first wall portion, and one of said openings being larger than the other and serving as a means for removing said piece from the chamber, said second wall portion extending between the tube and barrel and being coextensive therewith in length, said second wall portion being concentric with said tube and barrel.

References Cited in the file of this patent

UNITED STATES PATENTS

| 1,520,379 | Wermine | Dec. 23, 1924 |
| 2,189,547 | Fischer | Feb. 6, 1940 |
| 2,458,898 | Di Addario | Jan. 11, 1949 |
| 2,465,573 | Brannon | Mar. 29, 1949 |
| 2,648,507 | Kitzrow | Aug. 11, 1953 |
| 2,651,476 | Morin | Sept. 8, 1953 |

FOREIGN PATENTS

| 459,210 | Italy | Sept. 1, 1950 |